(12) United States Patent
Park et al.

(10) Patent No.: US 6,300,274 B1
(45) Date of Patent: Oct. 9, 2001

(54) CDS PHOTOCATALYST FOR HYDROGEN PRODUCTION, PREPARATION THEREFOR AND METHOD FOR PRODUCING HYDROGEN BY USE OF THE SAME

(75) Inventors: Dae-Chul Park; Jin-Ook Baeg, both of Daejon (KR)

(73) Assignees: Korea Research Institute of Chemical Technology, Daejon; Chunggu Co., Ltd., Daegu, both of (JP)

( * ) Notice: Subject to any disclaimer, the term of this patent is extended or adjusted under 35 U.S.C. 154(b) by 0 days.

(21) Appl. No.: 09/511,322

(22) Filed: Feb. 23, 2000

(51) Int. Cl.$^7$ .............................. B01J 23/40; B01D 5/00

(52) U.S. Cl. ..................... 502/327; 502/326; 204/157.52

(58) Field of Search ...................... 204/157.52; 526/915; 502/80, 439, 326, 327

(56) References Cited

U.S. PATENT DOCUMENTS 6,077,497 * 6/2000 Park et al. ...................... 205/157.52

* cited by examiner

*Primary Examiner*—Kathryn Gorgos
*Assistant Examiner*—Thao Tran
(74) *Attorney, Agent, or Firm*—Jacobson Holman, PLLC

(57) ABSTRACT

The present invention relates to a novel CdS photocatalyst for producing hydrogen from water by photoreaction and preparation therefor, and method for producing hydrogen by using of the CdS photocatalyst. The CdS photocatalyst is characterized by the following general formula V:

$$m(A)/Cd[M(B)]S \qquad V$$

wherein m represents a doped metal element as an electron acceptor, such as Pt, Ru, Ir, Co, Rh, Cu, Pd, Ni, or the oxidized compound of one of these metals; A represents a percentage by weight of m, ranging from 0.10 to 2.50; M is catalyst element, e.g. V, Cr, Al and P; and B represents a mole % of M(M+Cd), ranging from 0.05 to 20.00.

14 Claims, No Drawings

CDS PHOTOCATALYST FOR HYDROGEN PRODUCTION, PREPARATION THEREFOR AND METHOD FOR PRODUCING HYDROGEN BY USE OF THE SAME

TECHNICAL FIELD

The present invention relates, in general, to a photocatalyst for hydrogen production and, more particularly, to a photoreaction in which hydrogen can be efficiently and economically produced from water in the presence of a CdS photocatalyst. Also, the present invention is concerned with a method for preparing the photocatalyst and a method for producing hydrogen by use of the same.

BACKGROUND ART

Hydrogen is generally used to produce ammonia and methanol and is applied to produce saturated compounds as an essential element. Also, it plays a pivotal role in hydrotreating processes, including hydrogen addition, desulfurization, denitrogenation, demetallization and especially the hydrogenation of carbon dioxide, which causes global warning. Furthermore, hydrogen is viewed as a pollution-free energy source and a substitute for existing fossil fuels.

There are many different kinds of conventional methods for producing hydrogen, which include extraction from fossil fuels, such as a naphtha, modification of natural gas, the reaction of vapor with iron at a high temperature, the reaction of water with alkaline metal, electrolysis of water, etc.

However, these techniques are economically unfavorable because immense heat or electric energy is required and, particularly, in the modification of fossil fuels, a large quantity of carbon dioxide is generated as a by-product. With electrolysis, problems, such as the short electrode lifetime and oxygen generated as a by-product, need to be solved. Thus, it has heretofore been economically unfavorable to solve these problems due to the huge cost of facilities for hydrogen production.

Hydrogen gas can readily escape from the gravity of the earth because it is of low specific gravity, and most of it exists in water or inorganic forms. For these reasons, only a small quantity of hydrogen exists in the atmosphere. Also, it is very difficult to purify hydrogen existing in an inorganic form. If possible, it is also not economically favorable. Thus, the development of techniques whereby high-purity hydrogen can be efficiently obtained from water is very important for solving the urgent problem of exploiting substitute energy sources.

Recently, hydrogen producing techniques have been developed in which a photocatalyst is used to decompose water into hydrogen and oxygen. However, there is little published prior art relating to photocatalysts for producing hydrogen. Representative prior art is exemplified by Japanese Pat. Laid-Open Publication Nos. Sho 62-191045 and Sho 63-107815.

Japanese Pat. Laid-Open Publication No. Sho 62-191045 shows that hydrogen is generated from a photolysis reaction of an aqueous $Na_2S$ solution in the presence of a rare-earth element compound. Also, the rare-earth element compound as a catalyst has an advantage of exhibiting an optical activity in the range of the visible light.

Japanese pat. Laid-Open Publication No. Sho 63-107815 describes a photolysis reaction in which a composite oxide of niobium and alkali earth metal is used as a photocatalyst to generate hydrogen from a methanol solution in water. Likely, this photocatalyst has an advantage of being optically active in the visible light range.

However, the noted prior art is disadvantageous in that the amount of hydrogen generated is small, and the rate of production is 10 ml/0.5g hr.

There are Korean Pat. Appl'n. No. 95-7721, No.95-30416 and No.96-44214, which are believed to solve the above problems.

Korean Pat. Appl'n. No. 95-7721 suggests a photocatalyst represented by the following general formula I:

$$Cs(a)/K_4Nb_6O_{17} \hspace{3em} \text{I}$$

In the presence of the photocatalyst of formula I, UV light is irradiated onto an aqueous solution mixed with oxygen-containing organic compounds, such as formaldehyde and alcohol, acting as a hydrogen-generating promoter, to produce hydrogen. This technique has little affect on the environment and can generate hydrogen at room temperature. However, the oxygen-containing organic compounds acting as a hydrogen-generating promoter to produce hydrogen make it impossible to reuse the reactants.

Korean Pat. Appl'n No. 95-30416 suggests a photocatalyst represented by the following formula II:

$$Cs(a)H(c)/S(b) \hspace{3em} \text{II}$$

This technique also has little affect the environment and can generate hydrogen without the oxygen-containing organic compound as a hydrogen-generating promoter at room temperature but has some problems with the lifetime and stability of the photocatalyst of formula II.

For example, when alkali metal, such as cesium (Cs), is impregnated in a photo-carrier, the amount of hydrogen generated is outstandingly increased but the catalyst stability is decreased.

In addition, Korean Pat. Appl'n No. 96-44214 describes a photocatalyst represented by the following formula III:

$$Pt(a)/Zn[M(b)]S \hspace{3em} \text{III}$$

This technique likewise has little affect on the environment. Although depending on electron donors and reducing agents, the photocatalyst of formula m is superior in simplicity of preparation, stability, and lifetime, as well as optical activity in the visible light range, compared with previously-noted inventions. But the amount of produced hydrogen is economically unfavorable.

DISCLOSURE OF THE INVENTION

Therefore, it is an object of the present invention to overcome the above problems encountered in prior art and to provide a novel photocatalyst for producing hydrogen with an optical activity in the range of visible light adjusted by a light filter, with a high yield of hydrogen and with an infinite lifetime of the photocatalyst.

In accordance with an aspect of the present invention, there is provided a photocatalyst represented by the following general formula V:

$$m(A)/Cd[M(B)]S \hspace{3em} \text{V}$$

wherein m represents a doped metal element as an electron acceptor selected from the group of Pt, Ru, Ir, Co, Rh, Cu, Pd, Ni, or an oxidized compound of these metals; A represents a percentage by weight of m, ranging from 0.10 to 2.50; M is a promoter selected from the group consisting of V, Cr, Al and P; B represents mole % of M/(M+Cd), ranging from 0.05 to 20.00.

The preparation of photocatalyst in the present invention is characterized by the doping procedure as the following steps of: dissolving Cd-containing and M-containing compounds in water in such an amount that the % by weight of M ranges from 0.05 to 20.00; adding $H_2S$ or $Na_2S$ as a reactant in the solution with stirring to precipitate Cd[M]S; washing the precipitate with water until the pH of the wash water reaches 7 and vacuum-drying the precipitate in a nitrogen atmosphere; adding a liquid m-containing compound to this precipitate in such an amount that the % by weight of m ranges from 0.10 to 2.50.

In accordance with a further aspect of the present invention, there is provided a method for producing hydrogen, in which visible light adjusted by light filter or sunlight is irradiated onto a suspension of the photocatalyst in water to which $Na_2S$ (as an electron donor) and $NaH_2PO_2$ (as a reducing agent) are added.

BEST MODE FOR CARRYING OUT THE INVENTION

Acting as an electron acceptor, the doping metal, m, in the photocatalyst of the present invention is an element selected from the group consisting of Pt, Ru, Ir, Co, Rh, Cu, Pd, and Ni or an oxide thereof and is used preferably at such an amount that the % by weight of m ranges approximately from 0.10 to 2.50. For example, if the amount of m ingredient is below 0.10% by weight, the amount of hydrogen generated is decreased and the stability of photocatalyst is also decreased. On the other hand, if the amount of m ingredient is over 2.50 % by weight, the amount of hydrogen generated is decreased and the production cost is not economically favorable.

In the photocatalyst of the present invention, M is selected from the group consisting of V, Cr, Al, and P, and B represents a mole % of M/(M+Cd), ranging from 0.05 to 20.00. If the value of B is less than the lower limit, the activity of photocatalyst will be decreased. On the other hand, if the value of B is over the upper limit, the amount of generated hydrogen is decreased. As to the amount of cadmium and sulfur, it is preferred that the molar ratio of cadmium and sulfur ranges from 1:0.1 to 1:2.8 and, more preferably, from 1:0.6 to 1:1.4. Within said molar ratio ranges, the efficiency of photocatalyst of the present invention is increased.

In the preparation of said photocatalyst, if m is platinum (Pt) as a doping element, it is preferable for Pt to be illuminated with UV in a nitrogen atmosphere and doped on the Cd[M]S by sintering. More preferably, hydrogen hexachloroplatinate ($H_2PtCl_6$) is added to the Cd[M]S precipitate and irradiated with UV light in a nitrogen atmosphere to impregnate the carrier at such an amount that the value of A for Pt(A) ranges from 0.10 to 2.50. The precipitate thus obtained is washed with water until the wash water pH reaches 7, vacuum-dried at 105 to 120° C. for 1.5 to 2.5 hours, oxidation-sintered at 300 to 400° C. for 1.0 to 2.0 hours and then reduction-sintered at 300 to 400° C. for 1.0 to 2.0 hours.

In case of other doping elements, the preferable preparation example of the photocatalyst comprises the steps of: adding an m-containing compound other than platinum to the Cd[M]S precipitate obtained to reach the value of m ranging from 0.10 to 2.50; adding slowly 5 or 6 drops of conc. hydrochloric acid with stirring; applying ultra sonication to the obtained slurry for 1.0 to 5.0 minutes; drying at 105 to 120° C. for 1.5 to 3.0 hours in vacuo; oxidation-sintering at 300 to 400° C. for 1.0 to 3.0 hours and then reduction-sintering at 300 to 400° C. for 1.0 to hours, to yield a final photocatalyst.

In the preparation of photocatalyst doped with platinum, the reason why it is dried and sintered at oxidation/reduction state after the pH reaches 7 is to keep electron acceptor, Pt, in pure state. As well known, when Pt in $H_2PtCl$ is irradiated with UV, Pt activates the surface of CdS and makes a bond with separated S to form PtS and therefore a Wurzite structure is obtained by sintering under oxidation and reduction states at a temperature of from 300 to 400° C. In case of sintering said product at a temperature of 300 to 400° C. for 1.0 to 2.0 hours, Pt as an electron acceptor can be transferred to pure state of Pt(0). More preferably, it should be sintered at a temperature of from 320 to 380° C. Beyond this temperature range, the lifetime and optical activity of said photocatalyst is decreased.

Examples of the Cd-containing compounds include $CdSO_4.H_2O$ and $Cd(NO_3)_2.4H_2O$, and examples of the M-containing compounds include $VCl_3$, $VOS_4$, $VOCl_3$, $K_2Cr_2O_7$, $Cr(NO_3)_3$, $Al(NO_3)_3$, $AlCl_3$, $H_3PO_2$, etc. And then also examples of the m-containing compounds include $RuCl_3$, $Co(NO_3)_2$, $CoCl_2$, $Co(CH_3COO)_2$, $Rh(NO_3)_3$, $IrCl_3$, $Ni(NO_3)_2$, $NiCl_2$, $Pd(NO_3)_2$, $CuCl_2$, $Cu(NO_3)_2$, $CuSO_4$, etc.

In Korean Pat. Appl'n No. 96-44214 etching with acid is required after the primary sintering, but in this present invention, only the step of drying the precipitate in vacuo in a nitrogen atmosphere is needed, so the steps for the primary sintering and etching with acid are not needed in this preparation.

To prepare hydrogen according to the present invention, both from 0.15 to 0.40 mol/liter of $Na_2S$ as an electron donor and from 0.20 to 0.50 mol/liter of $NaH_2PO_2$ as a reducing agent are dissolved in primary and/or secondary distilled water or simply filtered water, and the photocatalyst of the present invention is added. Then, this suspension is irradiated with visible light adjusted by a light filter or sun light with stirring at a temperature of from 5 to 85° C. at from 0.1 atm. up to 5 atm. to yield hydrogen in a high degree of efficiency.

Furthermore, it is an important step to keep the concentration range of electron donor and reducing agent within the noted limits. If it is below the lower limit, the amount of hydrogen generated is decreased; if it is excess, the amount of hydrogen generated can not be increased further. The best reaction conditions are at a temperature of from 10 to 60° C. in from a vacuum to 2 atm.

The photocatalyst of the present invention has an infinite lifetime if the electron donor and reducing agent are added repeatedly to the reaction. The reaction time of conventional ZnS photocatalyst is only 6 to 8 hours, but, surprisingly, the reaction time of photocatalysts of this invention is from 20 to 25 hours, which means that said photocatalyst has continuously kept its activity pretty well.

PREPARATION EXAMPLE I

Admix with 250 ml of water, $CdSO_4.H_2O$, $K_2Cr_2O_7$ as a promoter and $H_2S$ as a reactant until a precipitate appears. Stir the resulting admixture wherein the precipitate is CdMS. Wash this precipitate with wash water until the pH of the wash water reaches 7. Vacuum-dry the thus-washed precipitate in a nitrogen atmosphere at a temperature of 110° C. for 2 hours to yield a CdCrS powder.

To this powder, add $RuCl_3.3H_2O$ to impart 1% by weight of Ru to the precipitate. Then slowly add 5 to 6 drops of conc. hydrochloric acid with stirring, followed by ultra sonication of the obtained product for 3 minutes, drying at a temperature of 100° C. for 2 hours, and finally oxidation sintering at a temperature of 350° C. for 1.5 hours to yield a final $RuO_2(1.0)/Cd[Cr(0.1)]S$ photocatalyst.

PREPARATION EXAMPLE II

Repeat Preparation Example I with an increased amount of $K_2Cr_2O_7$ to yield a final $RuO_2(1.0)/Cd[Cr(4.76)]S$.

PREPARATION EXAMPLE III

Repeat the procedure of Preparation Example I, except substitute $Al(NO_3)_3$ for the $K_2Cr_2O_7$ as a promoter to yield a final $RuO_2(1.0)/Cd[Al(0.5)]S$ photocatalyst.

PREPARATION EXAMPLE IV

Repeat the procedure of Preparation Example III, except substitute $Al(NO_3)_3$ for the $K_2Cr_2O_7$ as a promotor to yield a final $RuO_2(1.0)/Cd[Al(4.76)]S$ photocatalyst.

PREPARATION EXAMPLE V

Repeat the procedure of Preparation Example II, except substitute $H_3PO_2$ for the $K_2Cr_2O_7$ as a promotor to yield a final $RuO_2(1.0)/Cd[P(4.76)]S$ photocatalyst.

PREPARATION EXAMPLE VI

Repeat the procedure of Preparation Example V, except: follow the oxidation sintering by reduction sintering at a temperature of 350° C. for 1.5 hours, and add sufficient $RuCl_3.3H_2O$ to impart 1% by weight of Ru to the precipitate to yield a final $Ru(1.0)/Cd[P(4.76)]S$ photocatalyst.

PREPARATION EXAMPLES VII

Repeat the procedure of Preparation Example VI, except: substitute $NiCl_2.6H_2O$ for the $RuCl_3.3H_2O$ to impart 1% of nickel to the precipitate and thus yield a final $Ni(1.0)/Cd[P(4.76)]S$ photocatalyst.

PREPARATION EXAMPLE VIII

Repeat the procedure of Preparation Example VI except: substitute $VCl_3$ for the $H_3PO_2$ as a promotor to yield a final $Ni(1.0)/Cd[V(4.76)]S$ photocatalyst.

PREPARATION EXAMPLE IX

Repeat the procedure of Preparation Example VII with $NiCl_2.6H_2O$ to impart 0.5 weight % of nickel to the precipitate and thus yield a final $Ni(0.5)/Cd[P(4.76)]S$ photocatalyst.

PREPARATION EXAMPLE X

Repeat the procedure of Preparation Example VII with $NiCl_2.6H_2O$ to impart 2.0 weight % of nickel to the precipitate and thus yield a final $Ni(2.0)/Cd[P(4.76)]S$ photocatalyst.

PREPARATION EXAMPLE XI

Repeat the procedure of Preparation Example VII without the process of reduction sintering to yield a final $NiO(1.0)/Cd[P(4.76)]S$ photocatalyst.

PREPARATION EXAMPLE XII

Repeat the procedure of Preparation Example VII except: substitute $Pd(NO_3)_2$ for the $NiCl_2.6H_2O$ to yield a final $Pd(1.0)/Cd[P(4.76)]S$ photocatalyst.

PREPARATION EXAMPLE XIII

Repeat the procedure of Preparation Example XII omitting the reduction sintering and thus yielding a final $PdO(1.0)/Cd[P(4.76)]S$ photocatalyst.

PREPARATION EXAMPLE XIV

Repeat the procedure of Preparation Example XII except: substitute $Rh(NO_3)_3$ for the $Pd(NO_3)_2$ to yield a final $Rh(1.0)/Cd[P(4.76)]S$ photocatalyst.

PREPARATION EXAMPLE XV

Repeat the procedure of Preparation Example XII except: substitute $Co(NO_3)_2$ for the $Pd(NO_3)_2$ to yield a final $Co(1.0)/Cd[P(4.76)]S$ photocatalyst.

PREPARATION EXAMPLE XVI

Repeat the procedure of Preparation Example XII except: substitute $IrCl_3$ for the $Pd(NO_3)_2$ to yield a final $Ir(1.0)/Cd[P(4.76)]S$ photocatalyst.

PREPARATION EXAMPLE XVII

Add $H_2PtCl_6$ instead of $IrCl_3$ to the powder $Cd[P(4.76)]S$ obtained in accordance with Preparation Example XVI, to impart 0.8% by weight of Pt to that powder. Illuminate the resulting precipitate with UV light (450 W, high pressure mercury lamp 4 cm from sample) in a nitrogen atmosphere for 0.5 hour, wash the thus illuminated precipitate with wash water until pH of the wash water reaches 7, subject the washed precipitate to drying at a temperature of 110° C. for 2 hours followed by oxidation sintering in air at a temperature of 350° C. for 1.5 hours and then reduction sinterin (in a 95/5 nitrogen/hydrogen atmosphere) at a temperature 350° C. for 1.5 hours to yield a final $Pt(0.8)/Cd[P(4.76)]S$ photocatalyst.

PREPARATION EXAMPLE XVIII

Repeat the procedure of Preparation Example XVII except: add $H_2PtCl_6$ to the powder to impart 0.4% by weight of Pt to the precipitate and thus yield a final $Pt(0.4)/Cd[P(4.76)]S$ photocatalyst.

PREPARATION EXAMPLE XIX

Repeat the procedure of Preparation Example XVII except: add $H_2PtCl_6$ to the precipitate to impart 2.0 weight % of Pt to the precipitate and thus yield a final $Pt(2.0)/Cd[P(4.76)]S$ photocatalyst.

PREPARATION EXAMPLE XX

Add $H_2PtCl_6$ to the powder $Cd[P(4.76)]S$ obtained in accordance with Preparation Example V to impart 0.8 weight % of Pt to that powder. Illuminate the Pt enhanced product (precipitate) with UV (450 W, high pressure mercury lamp 4 cm from sample) in a nitrogen atmosphere for 0.5 hour, wash the resulting precipitate with wash water until the wash water has a pH of 7; vacuum dry the thus-washed precipitate at 110° C. for 2 hours; add $RuCl_3.3H_2O$ to the resulting dried Pt/CdPS powder to impart 1.0 % by weight of Ru thereto; with sting slowly add 5 or 6 drops of conc. hydrochloric acid to the Ru-enhanced product; subject the thus-obtained product to ultra sonication for 3 minutes and then dry same at 110° C. for 2 hours. Subject the dried product to oxidation sintering at a temperature 350° C. for 1.5 hours to obtain a final $Pt(0.8)/Cd[P(4.76)]S/RuO_2(1.0)$ photocatalyst.

PREPARATION EXAMPLE XXI

Repeat the procedure of Preparation Example XX except: substitute $NiCl_2.6H_2O$ for the $RuCl_3.3H_2O$ to yield a final Pt(0.8)/Cd[P(4.76)]S/NiO(1.0) photocatalyst.

PREPARATION EXAMPLE XXII

Repeat the procedure of Preparation Example VII except: substitute $Cu(NO_3)_2$ the $NiCl_2.6H_2O$ to yield a final Cu(1.0) Cd[P(4.76)]S photocatalyst.

PREPARATION EXAMPLE XXIII

Repeat the procedure of Preparation Example I except: substitute $K_2Cr_2O_7$ for the amount used in the prior Example in order to impart Cr at a value of 25 mol % and thus yield a final $RuO_2(1.0)$/Cd[Cr(25)]S photocatalyst.

PREPARATION EXAMPLE XXIV

Repeat the procedure of Preparation Example VII except: substitute $NiCl_2.6H_2O$ for the amount used in the noted prior Example so as to impart 3% by weight of Ni in the product and thus yield a final Ni(3.0)/Cd[P(4.76)]S photocatalyst.

EXAMPLES I TO XXII AND COMPARATIVE EXAMPLES I AND II

Suspend 0.5 g of the photocatalyst, obtained in accordance with each of Preparation Examples I to XXIV, independently, in 500 ml of water which contains 0.24 mol/liter of $Na_2S$ and 0.35 mol/liter of $NaH_2PO_2$ and stir the resulting suspension at a speed of 300 rpm in a photo reactor of a closed gas circulation system. Illuminate the resulting suspension with visible light (500 W Xe lamp with an optical filter which passes light with a wavelength over 400 mm, with sample 4 cm from light source) at room temperature and at 1 atm. On analysis by gas chromatography and Burette the amounts of produced hydrogen thus obtained are reflected in Table 1 below.

EXAMPLE XXIII

This procedure measures the lifetime of photocatalyst. Suspend 0.5 g of photocatalyst obtained in accordance with Preparation Example XVII in 500 ml of water which contains 0.24 mol/liter of $Na_2S$ and 0.35 mol/liter of $NaH_2PO_2$ and thereafter add a further 0.24 mol/liter of $Na_2S$ and 0.35 mol/liter of $NaH_2PO_2$ into the above solution each subsequent period of 20 hours for total 100 hours, and measure the amount of produced hydrogen. As a result, the average value of the amount of produced gas during this procedure is 402 ml/hr, which is similar to the result (422 ml/hr) of Example XVII. Thus, the results of this procedure establish that the lifetime of the photocatalyst is almost infinite.

TABLE 1

| Exam. No. | Catalyst | Amount of Gas (ml/hr) |
|---|---|---|
| I | $RuO_2$(1 wt. %)/Cd[Cr(0.1)]S | 682 |
| II | $RuO_2$(1 wt. %)/Cd[Cr(4.76)]S | 443 |
| III | $RuO_2$(1 wt. %)/Cd[Al(0.5)]S | 455 |
| IV | $RuO_2$2(1 wt. %)/Cd[Al(4.76)]S | 518 |
| V | $RuO_2$(1 wt. %)/Cd[P(4.76)]S | 529 |
| VI | Ru(1 wt. %)/Cd[P(4.76)]S | 440 |
| VII | Ni(1 wt. %)/Cd[P(4.76)]S | 549 |
| VIII | Ni(1 wt. %)/Cd[V(4.76)]S | 431 |
| IX | Ni(0.5 wt. %)/Cd[P(4.76)]S | 240 |

TABLE 1-continued

| Exam. No. | Catalyst | Amount of Gas (ml/hr) |
|---|---|---|
| X | Ni(2 wt. %)/Cd[P(4.76)]S | 360 |
| XI | NiO(1 wt. %)/Cd[P(4.76)]S | 351 |
| VII | Pd(1 wt. %)/Cd[P(4.76)]S | 408 |
| VIII | PdO(1 wt. %)/Cd[P(4.76)]S | 390 |
| XIV | Rh(1 wt. %)/Cd[P(4.76)]S | 290 |
| XV | Co(1 wt. %)/Cd[P(4.76)]S | 195 |
| XVI | Ir(1 wt. %)/Cd[P(4.76)]S | 331 |
| XVII | Pt(0.8 wt. %)/Cd[P(4.76)]S | 422 |
| XVIII | Pt(0.4 wt. %)/Cd[P(4.76)]S | 285 |
| XIX | Pt(2 wt. %)/Cd[P(4.76)]S | 280 |
| XX | Pt(0.8 wt. %)/Cd[P(4.76)]S/$RuO_2$(1 wt. %) | 661 |
| XXI | Pt(0.8 wt. %)/Cd[P(4.76)]S/NiO(1 wt. %) | 426 |
| XXII | Cu(1.0 wt. %)/Cd[P(4.76)]S | 120 |
| C.I | $RuO_2$(1 wt. %)/Cd[Cr(25)]S | 70 |
| C.II | Ni(3.0 wt. %)/Cd[P(4.76)]S | 45 |

INDUSTRIAL APPLICABILITY

As apparent from the data, the photocatalysts in accordance with the present invention include other novel doping metals and various promotors. Also the photocatalyst of this invention shows better optical activity than that of the conventional photocatalysts, a simpler method of preparation compared with conventional methods, a much longer lifetime and an increased hydrogen production rate.

The present invention for novel photocatalysts, by introducing various kinds of doping metal elements and various catalyst's applications and its adding techniques, not only overcomes previous restricted activity of photocatalysts to light sources, but also simplifies preparing photocatalysts which are superior in life expectancy as well as hydrogen production yield.

The invention and its advantages are readily understood from the foregoing description. It is apparent that various changes may be made in the processes and compositions without departing from the spirit and scope of the invention or sacrificing its material advantages. The processes and compositions hereinbefore described are merely illustrative of preferred embodiments of the invention.

What is claimed is:

1. A CdS photocatalyst for the production of hydrogen, represented by the following formula V:

m(A)/Cd[M(B)]S wherein m represents a doped metal element or an oxide thereof, the metal element being an electron acceptor selected from the group consisting of Pt, Ru, Ir, Co, Rh, Cu, Pd and Ni;

A represents a percentage by weight of m, ranging from 0.10 to 2.50;

M is a catalyst element selected from the group consisting of V, Cr, Al and P; and B represents a mole % of M/(M+Cd), ranging from 0.05 to 20.00.

2. A CdS photocatalyst for the production of hydrogen in accordance with claim 1, wherein the molar ratio of Cd:S is from 1:0.1 to 1:2.8.

3. A CdS photocatalyst for the production of hydrogen in accordance with claim 1, wherein the molar ratio of Cd:S is from 1:0.6 to 1:1.4.

4. A method for preparing a CdS photocatalyst as claimed in claim 1, comprising the steps of: dissolving a Cd-containing and M-containing compound in water; to the thus-obtained solution adding $H_2S$ or $Na_2S$ as a reactant, with stirring, to obtain a precipitant Cd[M]S; washing the precipitant with wash water until the pH of the wash water reaches 7; vacuum-drying the thus-washed precipitate in a nitrogen atmosphere at from 105 to 120° C. for about 1.5 to 3.0 hours; and doping the thus-dried Cd[M]S precipitate by adding a liquid m-containing compound thereto in an amount of about 0.10 to 2.50% by weight.

5. A method in accordance with claim 4, in which the doping further includes UV illumination and sintering.

6. A method in accordance with claim 4, wherein said M-containing compound comprises a member selected from the group consisting of $VCl_3$, $VOSO_4$, $VOCl_3$, $K_2Cr_2O_7$, $Cr(NO_3)_3$, $Al(NO_3)_3$, $AlCl_3$ and $H_3PO_2$.

7. A method in accordance with claim 4, wherein said m-containing compound comprises a member selected from the group consisting of $H_2PtCl_6$, $RuCl_3$, $Co(NO_3)_2$, $CoCl_2$, $Co(CH_3COO)_2$, $RhCl_3$, $Rh(NO_3)_3IrCl_3$, $Ni(NO_3)_2$, $NiCl_2$, $Pd(NO_3)_2$, $CuCl_2$, $Cu(NO_3)_2$ and $CuSO_4$.

8. A method in accordance with claim 4, in which the doping includes UV illumination in a nitrogen atmosphere when m is platinum.

9. A method in accordance with claim 4, in which the doping includes oxidation and reduction sintering after UV illumination when m is platinum.

10. A method in accordance with claim 9, wherein the sintering is effected at a temperature of from 300 to 400° C.

11. A method in accordance with claim 4, wherein the Cd-containing compound includes $CdSO_4.H_2O$ or $Cd(NO_3)_2.4H_2O$.

12. A method in accordance with claim 4, which comprises adding hydrochloric acid before drying when m is not platinum.

13. A method for producing hydrogen, which comprises irradiating, with visible light adjusted by a light filter or with sun light, an aqueous suspension of a photocatalyst of claim 1, while stirring, which aqueous suspension comprises from 0.15 to 0.40 mols per liter of $Na_2S$ as an electron donor and from 0.2 to 0.5 mols per liter of $NaH_2PO_2$ as a reducing agent.

14. A method in accordance with claim 13, which comprises producing hydrogen at a temperature of from 10 to 60° C. in vacuum or at a pressure of up to 2 atmospheres.

* * * * *